(12) United States Patent
Lee et al.

(10) Patent No.: US 7,974,490 B2
(45) Date of Patent: Jul. 5, 2011

(54) APPARATUS AND METHOD TO IMPROVE CLARITY OF IMAGE

(75) Inventors: Ho-young Lee, Suwon-si (KR); Du-sik Park, Suwon-si (KR); Hyun-hwa Oh, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 995 days.

(21) Appl. No.: 11/889,443

(22) Filed: Aug. 13, 2007

(65) Prior Publication Data

US 2008/0137943 A1 Jun. 12, 2008

(30) Foreign Application Priority Data

Dec. 11, 2006 (KR) .................. 10-2006-0125649

(51) Int. Cl.
*G06K 9/40* (2006.01)
(52) U.S. Cl. .................. 382/263; 382/266; 382/275
(58) Field of Classification Search .......... 382/162, 382/163, 165, 167, 254, 255, 263, 266, 274; 345/593; 358/518
See application file for complete search history.

(56) References Cited

U.S. PATENT DOCUMENTS

| | | | | |
|---|---|---|---|---|
| 5,825,938 A * | 10/1998 | De Lange | ..................... | 382/263 |
| 6,507,364 B1 * | 1/2003 | Bishay et al. | ................. | 348/242 |
| 6,614,944 B1 * | 9/2003 | Levantovsky | ................. | 382/261 |
| 6,886,912 B2 * | 5/2005 | Mantell | ........................... | 347/43 |
| 7,046,403 B1 * | 5/2006 | Yhann | .......................... | 358/518 |
| 7,068,852 B2 * | 6/2006 | Braica | .......................... | 382/266 |
| 7,649,649 B2 * | 1/2010 | Eschbach et al. | ............. | 358/1.9 |

FOREIGN PATENT DOCUMENTS

| | | |
|---|---|---|
| JP | 2001-103507 | 4/2001 |
| KR | 10-2000-0055400 | 9/2000 |
| KR | 10-2001-0084015 | 9/2001 |
| KR | 10-2005-0106548 | 11/2005 |

\* cited by examiner

*Primary Examiner* — Kanji Patel
(74) *Attorney, Agent, or Firm* — Staas & Halsey LLP (57) ABSTRACT

Disclosed are an apparatus and method to improve clarity of images, which can prevent the degradation of the clarity of a display unit caused by deterioration of a contrast characteristic. The apparatus includes: an artifact reducing unit determining a representative color of one of the images and moving a color of an edge as the determined representative color; a filter extracting a high frequency component of the image; and a sharpness enhancement unit improving the clarity of the image having the color of the edge moved and the filtered high frequency component.

25 Claims, 12 Drawing Sheets

APPARATUS AND METHOD TO IMPROVE CLARITY OF IMAGE

CROSS-REFERENCE TO RELATED APPLICATIONS

This application claims priority from Korean Patent Application No. 10-2006-0125649 filed on Dec. 11, 2006 in the Korean Intellectual Property Office, the disclosure of which is incorporated herein by reference in its entirety

BACKGROUND

1. Field of the Invention

The present invention relates to an apparatus and method to improve the clarity of an image, and more particularly to an apparatus and method to improve the clarity of an image, which can prevent the degradation of the clarity of a display unit caused by deterioration of the contrast characteristic.

2. Description of the Related Art

Recently, with the development of display units made of new materials, an apparatus and software to improve the quality of an image have been developed hand-in-hand. The greatest effect on the recognition by humans of the quality of an image through eyesight is clarity of the image.

The representative display units, for example, PDP, LCD and projection TV, which have been developed to replace the conventional CRT-type display units, can be made to have a narrow, light and large screen. In the display units such as PDP, LCD and projection TV, however, the precision and clarity of output image signals are frequently degraded due to image noise, blurring, and the limitation of bandwidth of input signals.

Figure 1:
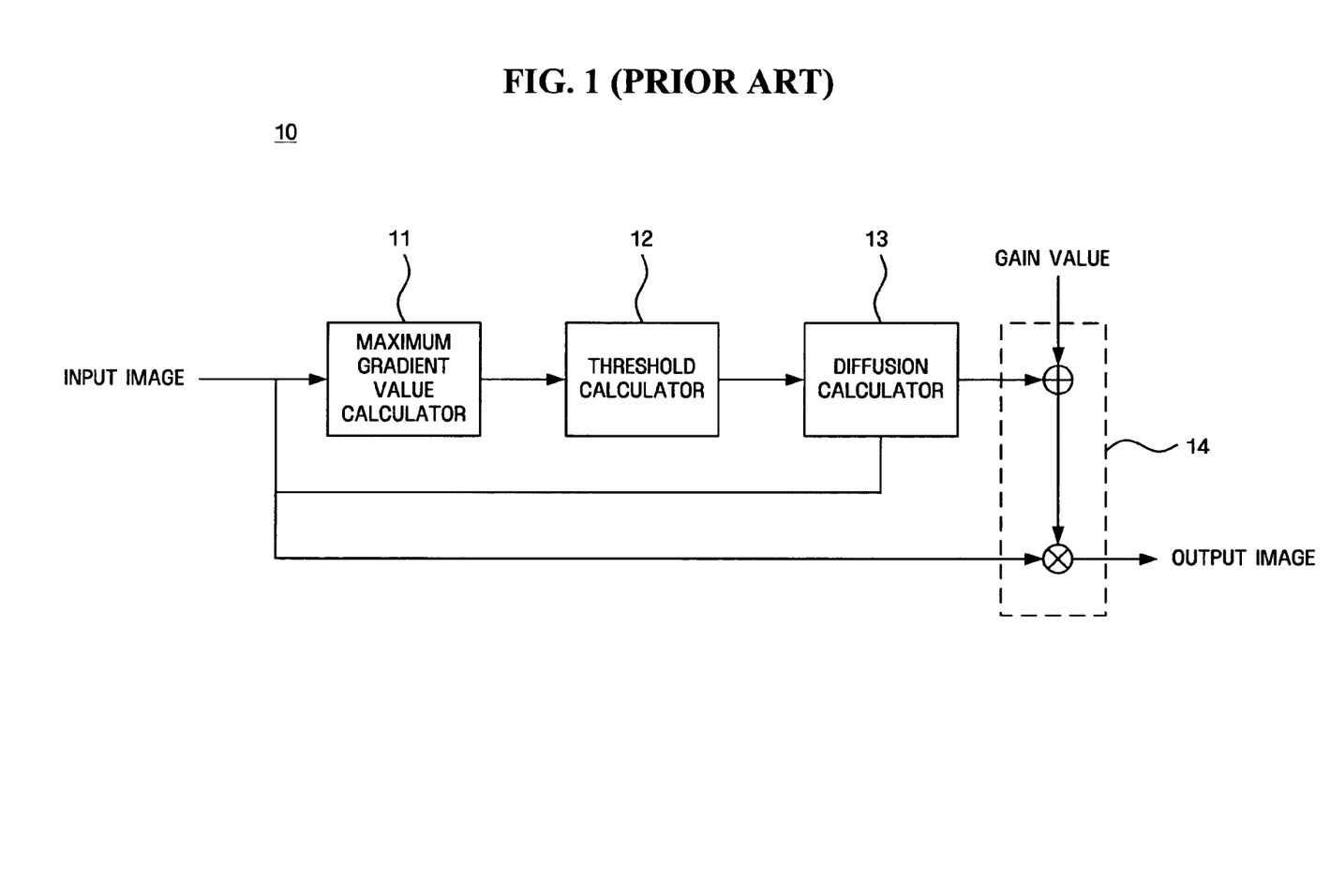
FIG. 1 is a block diagram illustrating an apparatus to improve the clarity of an image according to the conventional art.

FIG. 1 shows an apparatus to improve the clarity of images according to the conventional art.

As shown in FIG. 1, the apparatus 10 to improve the clarity of images according to the conventional art includes a maximum gradient value calculator 11 to set a window with a desired size to input image signals with respect to current pixels, and to calculate the maximum gradient value based on pixel values in the window, a threshold calculator 12 to calculate a threshold value corresponding to a magnitude of the maximum gradient value, a diffusion calculator 13 to calculate the amount of diffusion between a current pixel and adjacent pixels based on the calculated threshold value and a pixel difference between the adjacent pixels, and a pixel value converter 14 to output a pixel value by adding a product value of the calculated amount of diffusion and a gain value to the current pixel value.

The artifacts that cause a phenomenon of seemingly overlapped white-colored ripples around edges of an image are called 'shoot artifacts'. The apparatus 10 to improve the clarity of images according to the conventional art can calculate a Y signal of the input image signals and the maximum gradient angle of Y value of peripheral pixels, and then can remove a shoot artifact such that the threshold value is calculated based on the maximum gradient angle. The difference between the peripheral pixels is diffused through a gain adjustment so as to change the Y signal of the input image signal. However, since the clarity improvement apparatus 10 changes the Y signal value of the input image signal in proportion to an edge magnitude, it is difficult to effectively remove the shoot artifact with respect to the edge element. Furthermore, there is a problem of barely removing a ringing artifact occurring in another step of improving the clarity.

Korean Laid-open Patent Publication No. 2001-084015 discloses an apparatus to improve image quality including a decoder to divide input image signals into luminance signals and color difference signals, and a processor to detect a magnitude of the color difference among the signals output from the decoder and to remove the color difference signal, if the magnitude of the color difference is not greater than a reference value. However, in using a luminance signal of the input signals, the apparatus needs to convert a color space, and effectively removes a shoot artifact with respect to only a small edge element. Further, the apparatus cannot effectively remove a ringing artifact, in which jagged or fuzzy lines are produced in the vicinity of sharp edges of a reconstructed image, occurring in another step of improving the clarity.

SUMMARY

Accordingly, it is an object of the present invention to provide an apparatus and method to improve the clarity of images, which can adaptively convert the RGB of images based on the representative color of the images in order to remove an image deterioration factor, despite using an RGB color space.

Additional aspects and/or advantages of the invention will be set forth in part in the description which follows and, in part, will be apparent from the description, or may be learned by practice of the invention.

The foregoing and/or other aspects of the present invention are achieved by providing an apparatus to improve clarity of images, including an artifact reducing unit determining a representative color of one of the images and moving a color of an edge as the determined representative color, a filtering unit extracting a high frequency component of the images, and a sharpness enhancement unit improving the clarity of the image having the color of the edge moved and an improved high frequency component.

The foregoing and/or other aspects of the present invention are achieved by providing a method of improving clarity of images, including: determining a representative color of the images and moving the color of an edge to the determined representative color; filtering high frequency component of the image; and improving the clarity of the images through the image, in which color of the edge is moved, and the high frequency component of the image.

The foregoing and/or other aspects of the present invention are achieved by providing a method of improving clarity of an image having an object and a background. The method includes extracting a pair of initial representative colors from a block of the image, a color of the object being one of the initial representative colors and a color of the background being the other of the initial representative colors; moving a color of an edge of the object as one of the initial representative colors; and improving clarity of the image having the color of the edge moved.

BRIEF DESCRIPTION OF THE DRAWINGS

The above and/or other aspects, features and advantages of the present invention will be more apparent from the following detailed description taken in conjunction with the accompanying drawings, in which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Hereinafter, the apparatus and method to improve the clarity of images according to the embodiment of the present invention will be described with reference to block diagrams and flowcharts in the accompanying drawings. It will be understood that each block of the flowcharts and combinations of the flowcharts may be implemented by computer program instructions that can be provided and executed in a processor of a general-purpose computer, a special-purpose computer or other programmable data processing apparatus. The instructions executed by the processor of the computer or other programmable data processing devices create means for implementing the functions specified in the flow diagram blocks. These computer program instructions may also be stored in a computer-usable or computer-readable memory that can direct a computer or other programmable data processing apparatus to function in a particular manner. The computer program instructions stored in the computer-usable or computer-readable memory can produce an article of manufacture, including instruction means that implement the functions specified in the blocks of the flowcharts. The computer program instructions may also be loaded onto a computer or other programmable data processing apparatus so as to cause a series of operational steps to be performed on the computer or another programmable apparatus. The computer program instructions executed on the computer or other programmable apparatus produce a computer-based process, and thereby provide for a method to implement the functions specified in the blocks of the flowcharts.

Each block in the flowcharts may represent a part of modules, segments, or codes, which include one or more executable instructions to implement the specified logical function (s). It should also be noted that in some alternative implementations, the functions noted in the blocks may occur out of order. For example, two blocks shown in succession may in fact be executed substantially and concurrently or the blocks may be executed in the reverse order, depending on the functionality involved.

Figure 2:
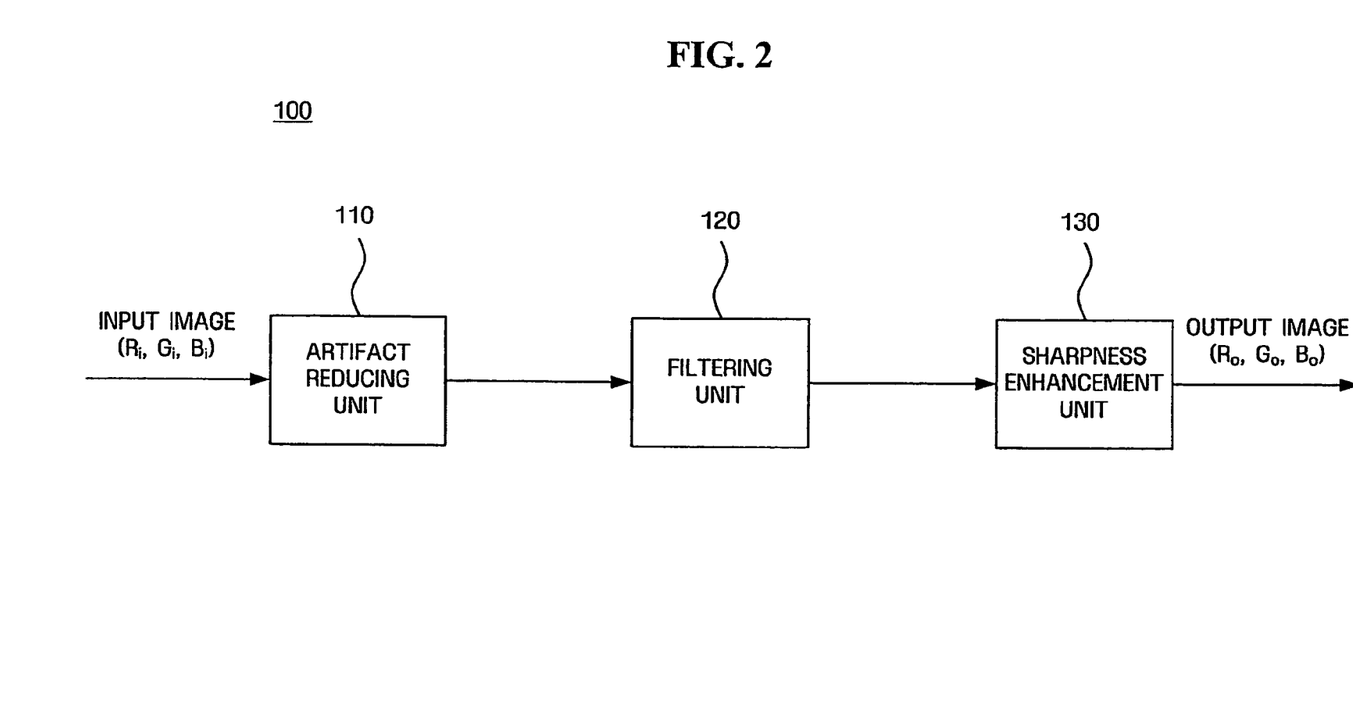
FIG. 2 is a block diagram illustrating an apparatus to improve the clarity of an image according to an embodiment of the present invention.

FIG. 2 is a view showing an apparatus to improve the clarity of images according to an embodiment of the present invention.

As shown in FIG. 2, the apparatus 100 to improve the clarity of the images according to the embodiment of the present invention includes an artifact reducing unit 110, a filtering unit 120, and a sharpness enhancement unit 130.

Figure 3:
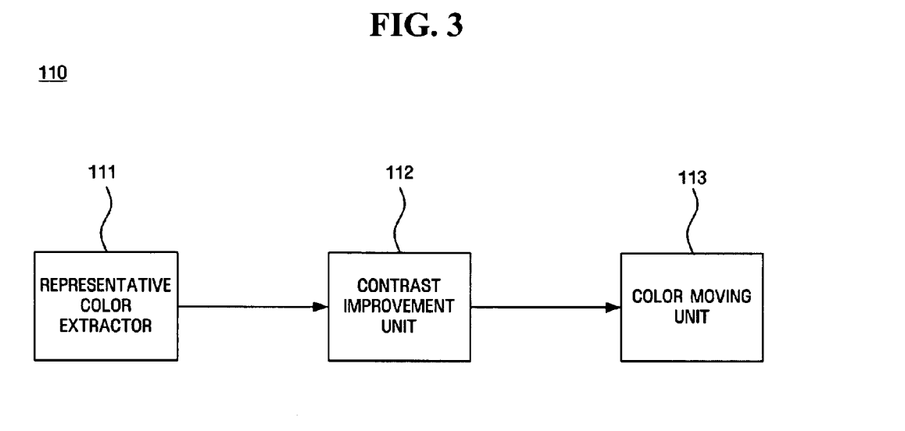
FIG. 3 is a block diagram illustrating an artifact reducing unit according to the embodiment of the present invention.

The artifact reducing unit 110 can move colors of edge pixels in a direction to a three-dimensional space of adjacent colors. In order to move the colors of the edge pixels, the artifact reducing unit 110, as shown in FIG. 3, includes a representative color extractor 111 to extract representative colors, a contrast improvement unit 112 to improve a contrast of extracted representative colors and a color moving unit 113 to move the colors of the edge pixels to the representative colors with the improved contrast.

The representative color extractor 111 obtains a luminance value with respect to R, G, and B of the input images, and then extracts pairs of R, G and B values of the pixels with minimum and maximum values as the initial representative color from a corresponding block. The representative color extractor 111 extracts the initial representative color based on the K-means algorithm, and applies pixel information of the block to the K-means algorithm based on the initial representative color to update the initial representative color. In updating the initial representative colors using the K-means algorithm, the resultant representative colors are extracted through repeated calculation. In the embodiment of the present invention, however, the number of repeated calculations may be limited to one time in order to implement hardware.

Figure 4:
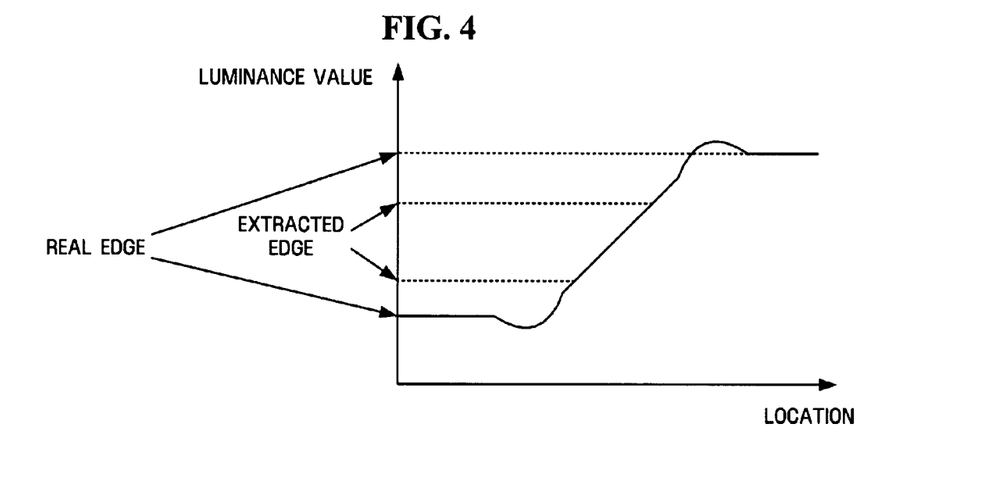
FIG. 4 is a graph showing a real edge and an extracted edge according to the embodiment of the present invention.

Accordingly, in the representative color extractor 111, the limitation of the number of repeated calculations causes an error between a real edge in a block and the extracted edge, as shown in FIG. 4. The contrast improvement unit 112 can then improve the contrast of the extracted initial representative color so as to compensate for the error caused due to the limitation of the number of repeated calculations. The extracted edge is a pair of initial representative colors extracted from the above-mentioned representative color extractor 111.

Figure 5:
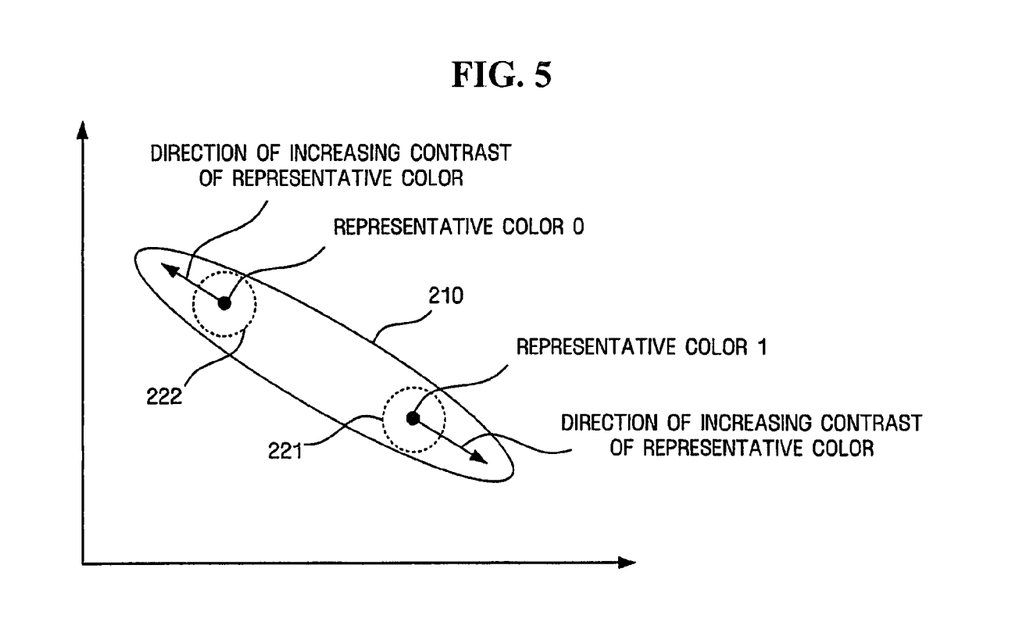
FIG. 5 is a graph showing color distribution according to the embodiment of the present invention.

Specifically, the contrast improvement unit 112 improves the contrast of the pair of initial representative colors extracted by the representative color extractor 111 from a color distribution 210 of a certain block on a two dimensional plan, as shown in FIG. 5. In the embodiment of the present invention, the pair of initial representative colors, which are extracted by the representative color extractor 111, will be referred to as 'representative color 0' and 'representative color 1', respectively. Further, in FIG. 5, circles 221 and 222 defined around the representative colors 0 and 1, respectively, indicate regions for predetermined critical values to prevent an increase of an inordinate contrast of the representative colors. The arrows illustrated in FIG. 5 show the direction of increasing contrast of the representative colors 0 and 1.

With the improvement of the contrast of the representative colors by the contrast improvement unit 112, it is possible to improve the contrast for the pair of representative colors extracted by the representative color extractor 111 from the inner product of a distance between the representative colors 0 and 1, and a distance between a predetermined pixel in a corresponding block and any one of the representative colors 0 and 1. The inner product may be obtained by the following equation (1):

$$Dist = (R_{rep0} - R_b)^2 + (R_{repr0} - G_g)^2 + (R_{rep0} - B_p)^2 \quad (1)$$

$$InnerProduct = \vec{BE}\vec{C}$$
$$= (R_b - R_{rep0})S(R_{rep1} - R_{rep0}) +$$
$$(G_b - G_{rep0})S(G_{rep1} - G_{rep0}) +$$
$$o(B_b - B_{rep0})S(B_{rep1} - B_{rep0})$$

Figure 6:
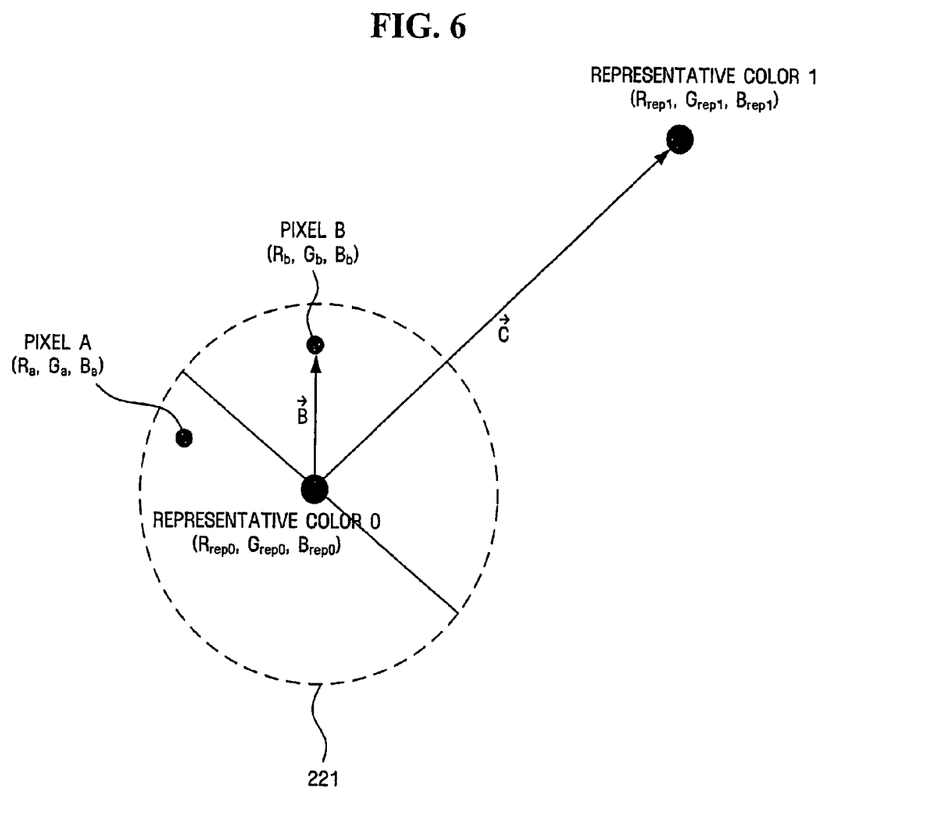
FIG. 6 is a graph showing an inner product to upgrade the representative color according to the embodiment of the present invention.

It can be understood that equation (1) may be substituted using the representative color 0 and a pixel B present in the block, as shown in FIG. 6. In equation (1), Dist is a distance between the representative colors 0 and 1. ($R_{rep0}$, $G_{rep0}$, $B_{rep0}$) and ($R_{rep1}$, $G_{rep1}$, $B_{rep1}$) indicate the representative colors 0 and 1, respectively. ($R_b$, $G_b$, $B_b$) denotes the color of a pixel B. Equation (1) can be identically applied to a pixel A.

The contrast improvement unit 112 selects a candidate color which is present in the region of the critical value to prevent an inordinate increase of the contrast in the color of a pixel and is used to update the initial representative color extracted by the representative color extractor 111. The region of the critical value to prevent the inordinate increase of the contrast can be obtained by the following equation (2):

$$\text{Limit-Dist} = [(R_{rep0} - R_{rep1})^2 + (R_{rep0} - G_{rep1})^2 + (R_{rep0} - B_{rep1})^2] K k \quad (2)$$

In equation (2), Limit-Dist is the critical value to prevent an inordinate increase of the contrast, ($R_{rep0}$, $G_{rep0}$, $B_{rep0}$) and ($R_{rep1}$, $G_{rep1}$, $B_{rep1}$) indicate the representative colors 0 and 1, respectively, and k is a constant.

On the other hand, the contrast improvement unit 112 applies equations (1) and (2) to all pixels in the block to finally obtain the representative color with the improved contrast. The color moving unit 113 measures the proximity of the pairs of representative colors, which are finally obtained, to a certain pixel at an edge and then adaptively moves the color of the edge pixel to remove the artifact. The color moving unit 113 measures the intensity of the edge in order to transfer colors using the pair of resultant representative colors, and may measure the proximity between the pair of resultant representative colors.

The intensity of the edge can be obtained by using the following equations (3) and (4) that determine the sum of a distance between the pair of resultant representative colors and a distance between the representative colors in each block of images:

$$\text{Rep\_Dist} = \sqrt{(R_{rep0} - R_{rep1})^2 + (G_{rep0} - G_{rep1})^2 + (B_{rep0} - B_{rep1})^2} \quad (3)$$
for $i: i == BlockHeight; i++$
for $j: j == BlockWidth; j++$ $$Dist = |R_{i,j} - R_{rep\_i,j}| + |G_{i,j} - G_{rep\_i,j}| + |B_{i,j} - B_{rep\_i,j}| \quad (4)$$
if $(Dist \times \text{Rep\_Dist})$ $TotalDist += Dist;$ In equation (3), Rep_Dist is a distance between the pair of resultant representative colors in the current block. In equation (4), TotalDist is a sum of distances between the pair of representative colors in each block of the images.

Accordingly, the intensity of the edge can be obtained from the ratio of Rep_Dist to TotalDist by the following equation (5):

$$\text{Intensity of Edge} = (\text{Rep\_Dist}/\text{TotalDist}) \times k, \quad (5)$$

where k is a constant.

Further, the proximity between the pair of resultant representative colors can be obtained through the distance between each representative color and the input color of the current pixel by the following equation (6):

$$Dist0 = (R_i - R_{rep0})^2 + (G_i - G_{rep0})^2 + (B_i - B_{rep0})^2$$

$$Dist1 = (R_i - R_{rep1})^2 + (G_i - G_{rep1})^2 + (B_i - B_{rep1})^2 \quad (6)$$

In equation (6), Dist0 is the distance between the representative color 0 and the input color of the current pixel, and Dist1 is the distance between the representative color 1 and the input color of the current pixel. Therefore, proximity can be obtained by Dist0/Dist1, which has a value between 0 and 1.

The extent of color transfer can be obtained from the proximity and the intensity of the edge by the following equation (7) using the color moving unit 113:

$$R_{i\_mode} += (1-\text{proximity}) \times \text{intensity of edge} \times (R_i - R_{rep\_i})$$

$$G_{i\_mode} += (1-\text{proximity}) \times \text{intensity of edge} \times (G_i - G_{rep\_i})$$

$$B_{i\_mode} += (1-\text{proximity}) \times \text{intensity of edge} \times (B_i - B_{rep\_i}) \quad (7)$$

wherein $R_{i\_mode}$, $G_{i\_mode}$, and $B_{i\_mode}$ denote the extent of color transfer.

Figure 7:
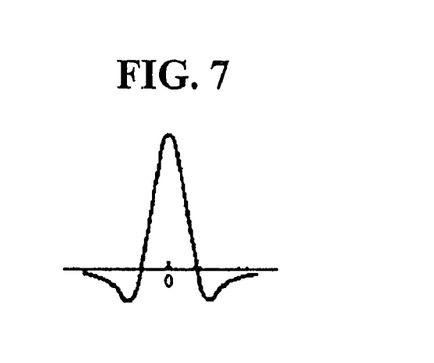
FIG. 7 is a graph showing a function used in a filter according to the embodiment of the present invention.

Meanwhile, the sharpness enhancement unit 130 can improve the clarity of images in which a degradation condition is removed by the artifact reducing unit 110 through a high frequency component that was filtered by the filtering unit 120. In the embodiment of the present invention, the filtering unit 120 uses a two-dimensional space filter. It will be described as an example, in which a sign inverted Gaussian, the waveform of which is shown in FIG. 7, is used as the filter. Further, the sharpness enhancement unit 130 may, as an example, improve the clarity of images through an unsharp masking method. A gain adjustment on the high frequency component may be performed, for example, by using a distance between a pair of resultant representative colors as a parameter, and a linearized straight line.

Figure 8:
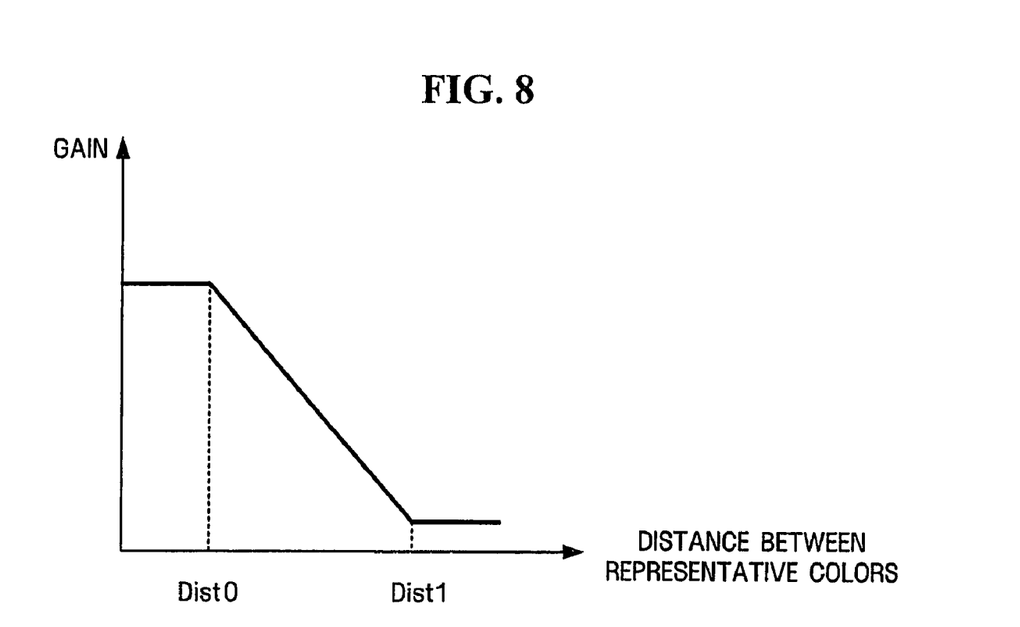
FIG. 8 is a graph showing gain in relation to distance between representative colors.
Figure 9:
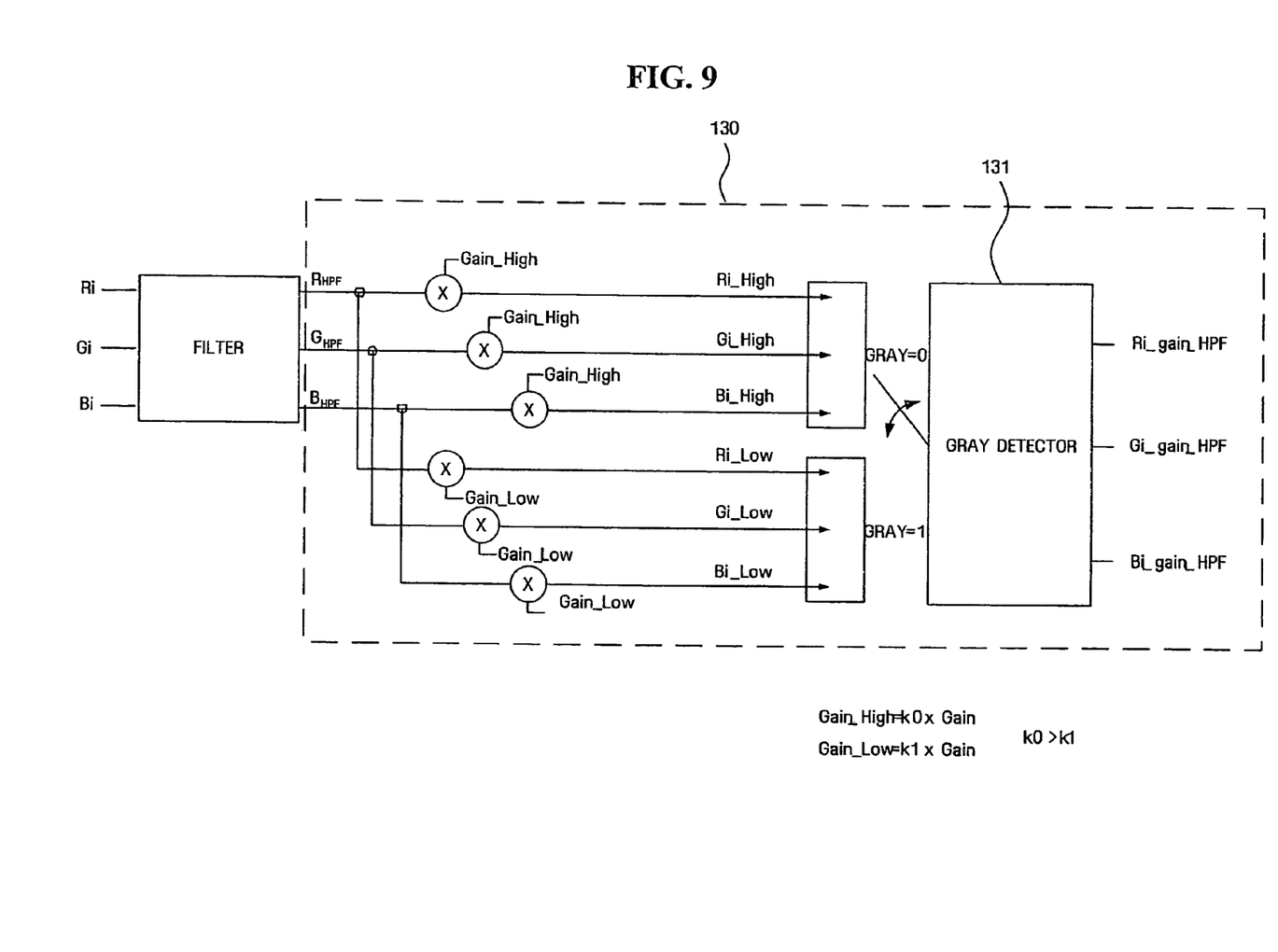
FIG. 9 is a block diagram showing a sharpness enhancement unit according to the embodiment of the present invention.

In other words, the sharpness enhancement unit 130 determines that a block has a strong edge, and so reduces a gain of the high frequency component for clarity improvement, when the distance between the pair of resultant representative colors increases, as shown in FIG. 8. On the other hand, when the distance between the pair of resultant representative colors decreases, the sharpness enhancement unit 130 increases the gain in order to maximize the improvement of the clarity. In FIG. 9, $R_{HPF}$, $G_{HPF}$ and $B_{HPF}$ indicate high frequency component filtered by the filtering unit 120, the gain is the high frequency component gain calculated using the distance between the pair of resultant representative colors, and Gain_High and Gain_Low are obtained by multiplying the gain by corresponding constants k0 and k1, respectively.

Further, the sharpness enhancement unit 130 may include a gray detector 131. In a case where a color component exists around a boundary because text of a gray component of most real images and a gray balance around the boundary are not established, the gray detector 131 determines that a color component is the gray component if the gain adjustment on the high frequency component based on the distance between the pair of representative colors satisfies equation (8) below. Thus, when the gray detector 131 determines that a color component is the gray component, in order to remove the color component, the detector 131 maintains the gray balance by multiplying the gray component by a value less than the original gain even though the distance between the resultant representative colors is low.

$$\text{if}(|R_i-G_i|<TH \&\& |G_i-B_i|<TH \&\& |B_i-R_i|<TH)$$
$$\text{Gray}=1$$

$$\text{else if } (MAX(|R-G|,|G-B|,|B-R|)<TH) \text{ Gray}=1$$

$$\text{else Gray}=0 \qquad (8)$$

In equation (8), Ri, Gi and Bi are R, G, and B components of the input images, respectively, and TH is a predetermined reference value. In this case, TH can be changed according to a specification of the display unit and a circumstance for use. If the gray component exists, Gray is equal to 1. If the gray component does not exist, Gray is equal to 0.

Figure 10:
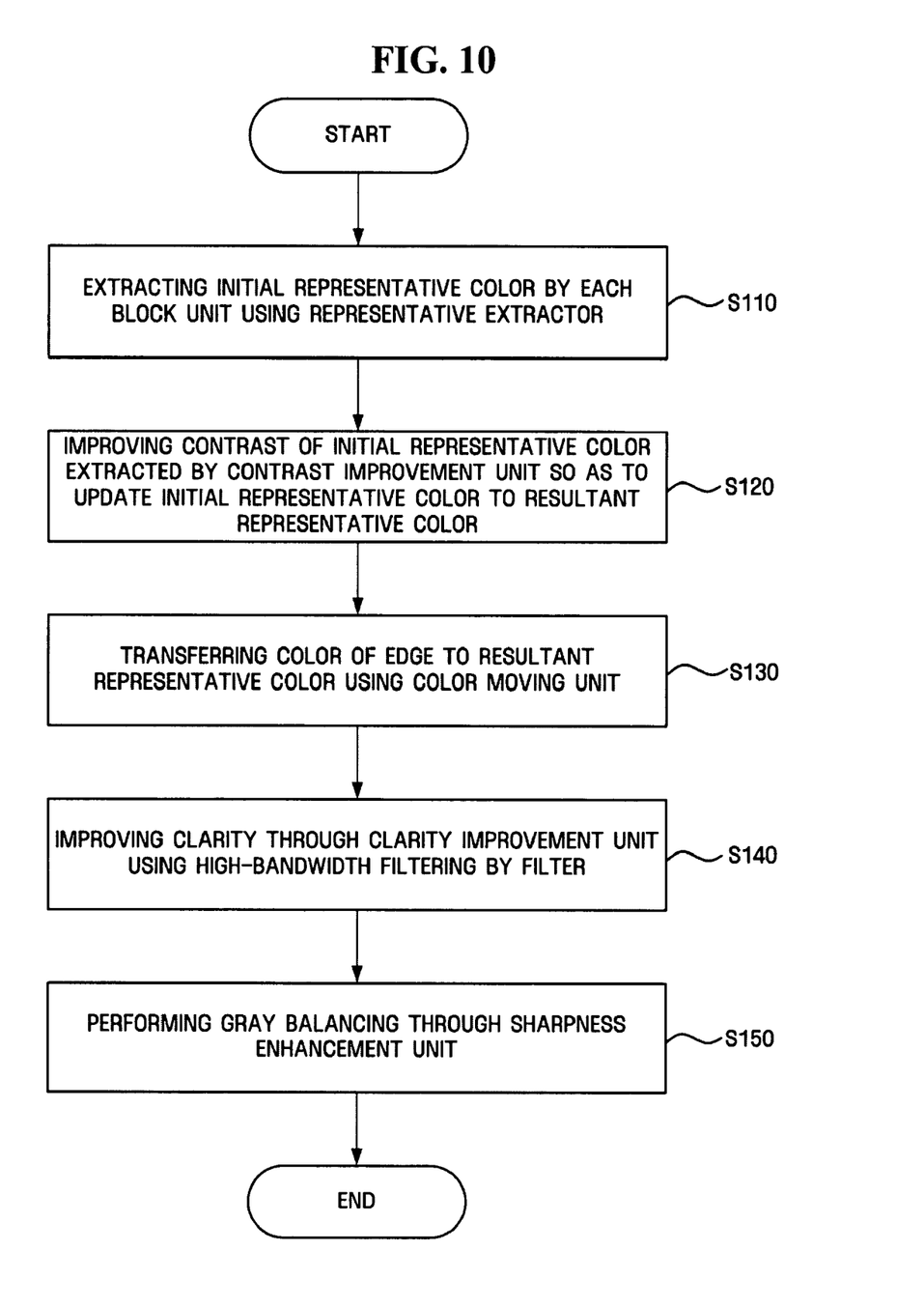
FIG. 10 is a flowchart illustrating a method to improve the clarity of the image according to the embodiment of the present invention.

FIG. 10 is a flowchart illustrating a method to improve the clarity of images according to the embodiment of the present invention.

As shown in FIG. 10, in the method to improve the clarity of images according to the embodiment of the present invention, the representative color extractor 111 first extracts an initial representative color with respect to each block of the input images (S110). At this time, a pair of initial representative colors may be extracted by block unit by the representative color extractor 111. A certain block recognizes the pair of representative colors as R, G and B values with the maximum and minimum luminance values.

In the embodiment of the present invention, the representative color extractor 111 extracts the pair of initial representative colors based on the K-means algorithm. Since the number of repeated calculations is limited to one time in order to implement hardware, there exists an error between the edge in the real block and the edge according to the extraction of the initial representative color.

Accordingly, the contrast improvement unit 112 improves the contrast of the pair of initial representative colors extracted by the representative color extractor 111 (S120) to update the initial representative color to a resultant representative color. In improving the contrast of the pair of initial representative colors extracted, the above-mentioned equations (1) and (2) are applied to all blocks in the images, so that the representative color with improved contrast is finally obtained.

The color moving unit 113 measures the proximity between the pair of resultant representative colors obtained by the contrast improvement unit 112 and a certain pixel, so as to transfer the color of the edge pixel, adaptively, to the resultant representative color (S130). The artifact can be removed through such color moving, which can be accomplished by using the edge intensity and proximity obtained through equations (3) and (6). Further, the color moving unit 113 calculates the extent of moving using the obtained edge intensity and proximity. The extent of moving can be obtained by the above-mentioned equation (7). Hence, the color moving unit 113 can move the color of the edge pixel depending on the obtained transfer intensity.

In a case where the color of the edge is moved by the color moving unit 113, when an image deterioration factor is removed, the sharpness enhancement unit 130 improves the clarity of images through the high frequency component filtered by the filtering unit 120 (S140). Specifically, when the distance between the two representative colors increases, the sharpness enhancement unit 130 determines that the block has an intensive edge, and then the sharpness enhancement unit 130 reduces an added value of the high frequency component in order to improve the clarity. When the distance between the two representative colors decreases, the color moving unit 113 increases the added value of the high frequency component in order to maximize the improvement of the clarity.

After the sharpness enhancement unit 130 improves the clarity of the images, the gray detector 131 performs gray balancing in order to prevent the color component from being put around the boundary as the text of the gray component such that gray balance around the boundary is not achieved (S150). At this time, the gray balancing can be performed under a condition of equation (8).

As described above, the images with clarity improved by the method of improving the clarity of the images shown in FIG. 10 will be described with reference to FIGS. 11 to 14.

Figure 11:
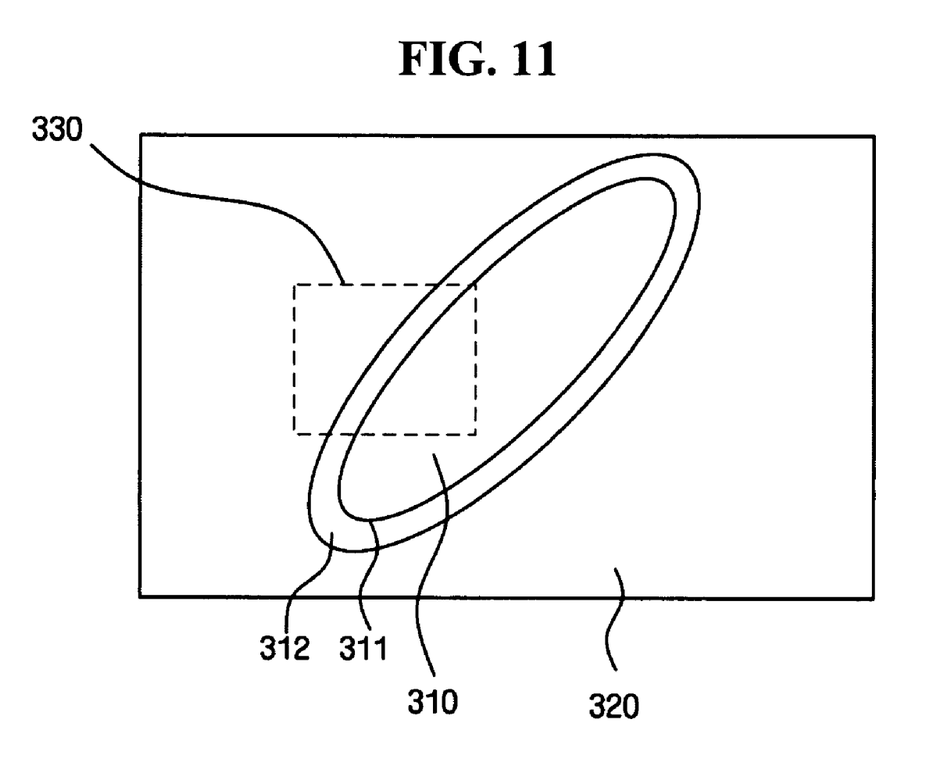
FIG. 11 is a schematic view showing the image according to the embodiment of the present invention.

First, as shown in FIG. 11, the image has an object 310 and a background 320. A blurred edge 312 is present around the object 310, resulting in a difference occurring between the blurred edge 312 and a real edge 311.

Figure 12:
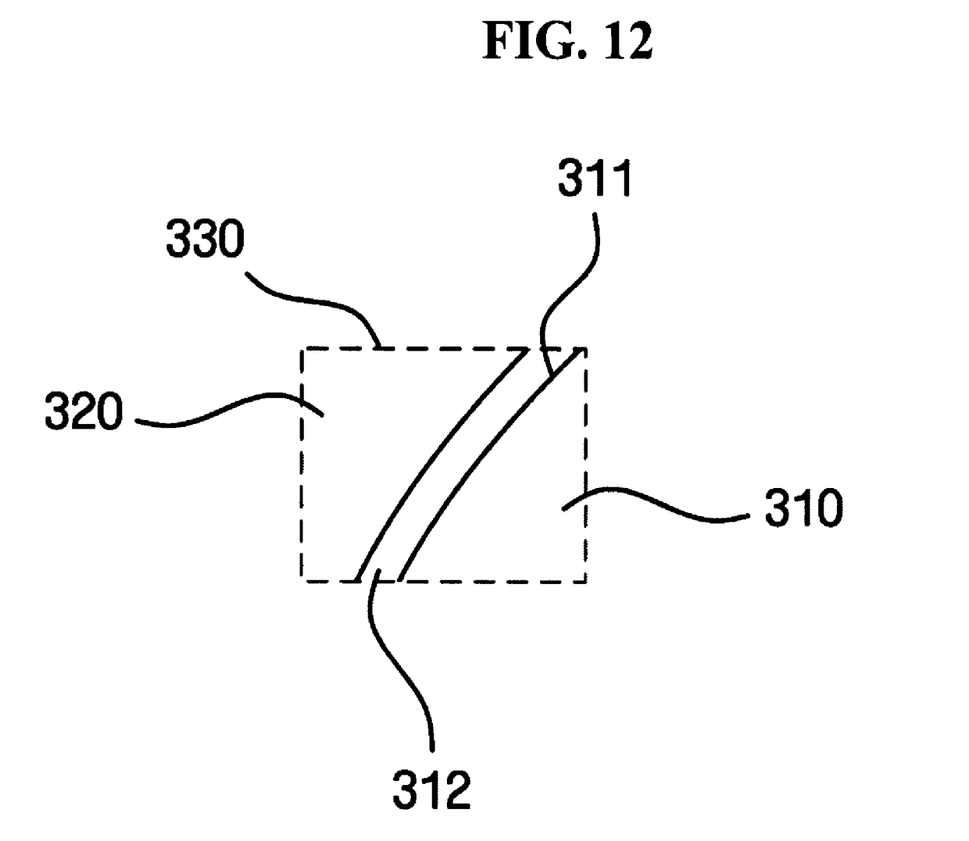
FIG. 12 is a schematic view showing a block of the image according to the embodiment of the present invention.
Figure 13:
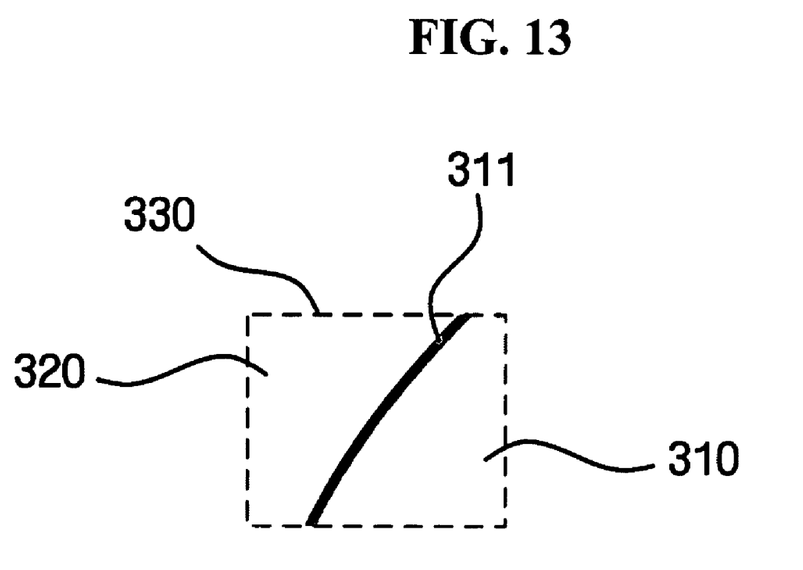
FIG. 13 is a schematic view showing a color of an edge in the block moved according to the embodiment of the present invention.
Figure 14:
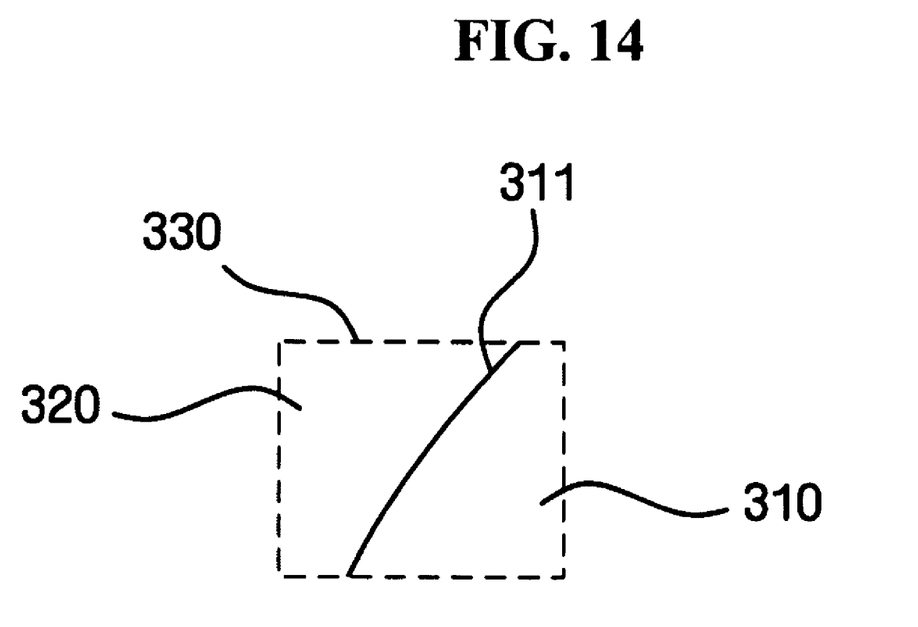
FIG. 14 is a schematic view showing improved clarity of the image according to the embodiment of the present invention.

At this time, the apparatus 100 to improve the clarity of the images according to the embodiment of the present invention extracts a pair of initial representative colors from a certain block 330, as shown in FIG. 12. In other words, the apparatus 100 can extract the color of the object 310 and the color of the background 320 as the pair of initial representative colors from the corresponding block 330. If the color of the object 310 is the representative color 0 and the color of the background 320 is the representative color 1, the color moving unit 113 moves the color of the real edge 311 as one of the two representative colors. As described above, when the color of the real edge 311 is moved as shown in FIG. 13, it is possible to remove the ringing artifact and the shoot artifact. Further, the sharpness enhancement unit 130 can improve the clarity using the high frequency component filtered by the filtering unit 120, as shown in FIG. 14.

The word "unit" used in the embodiment of the present invention refers to software, a structural hardware element such as a Field Programmable Gate Array (FPGA), or an Application Specific Integrated Circuit (ASIC), which carries out a certain function. However, the unit is not limited to the software or the hardware. The unit may be arranged within a storage medium capable of addressing, or constructed to implement, one or more processors. Accordingly, as an example, the unit includes structural elements, such as software structure elements, object-oriented software structure elements, class structure elements and task structure elements, processes, functions, attributes, procedures, subroutines, segments of program code, drivers, firmware, microcode, circuits, data, databases, data structures, tables, arrays, and parameters. The functions provided by the structural elements and the units are combined with the small number of the structural elements and the units, or provided to additional structural elements and the units.

As described above, the apparatus and the method of automatically creating the dynamic image object according to the present invention automatically creates the dynamic image object from the static contents, based on the template, and assigns various effects to the dynamic contents, thereby providing the specified and fresh images to the user, and enabling the user to instinctively and easily identify the relevancy of the contents.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. An apparatus to improve clarity of an image, comprising:
an artifact reducing unit to determine a representative color of the image and to move a color of an edge as the determined representative color using at least one processor;
a filtering unit to extract a high frequency component of the image; and
a sharpness enhancement unit to improve the clarity of the image having the color of the edge moved and the improved high frequency component,
wherein the artifact reducing unit comprises a representative color extractor to extract the representative color by each block unit of the image, a contrast improvement unit to improve a contrast of the extracted representative color, and a color moving unit to move the color of the edge to the representative color having improved contrast.

2. The apparatus according to claim 1, wherein the representative color extractor calculates a luminance value with respect to R, G and B components of the image in a certain block unit of the image, and then extracts pairs of R, G and B values of a pixel with minimum and maximum luminance values as an initial representative color.

3. The apparatus according to claim 2, wherein the contrast improvement unit updates a pair of initial representative colors using an inner product of a distance between one of the pair of the initial representative colors and another of the pair of the initial representative colors, and a distance between a certain pixel in the block unit and one of the pair of the representative colors.

4. The apparatus according to claim 3, wherein the contrast improvement improves the contrast in a preset critical value with respect to the pair of the initial representative colors.

5. The apparatus according to claim 4, wherein the color moving unit measures an edge intensity, and the proximity of a certain pixel of an edge and a resultant representative color updated by the contrast improvement unit, and then moves the color of the certain pixel of the edge.

6. The apparatus according to claim 5, wherein the edge intensity is obtained by adding the distance between a pair of the resultant representative colors to the distance between resultant representative colors in each block of the image.

7. The apparatus according to claim 5, wherein the proximity is obtained using a ratio of the distance between the certain pixel of the edge and each resultant representative color.

8. The apparatus according to claim 5, wherein the color moving unit obtains an extent of transfer from the proximity and the edge intensity, and moves the color with respect to the certain pixel of the edge according to the extent of transfer.

9. The apparatus according to claim 1, wherein the sharpness enhancement unit adds the high frequency component filtered by the filtering unit to the image in which the color of the edge is moved.

10. The apparatus according to claim 9, wherein the sharpness enhancement unit determines that a certain block has an intensive edge, and reduces a gain of the high frequency component when a distance between representative colors increases in the certain block, and increases a gain of the high frequency component when the distance between the representative colors decreases.

11. The apparatus according to claim 9, wherein the sharpness enhancement unit further comprises a gray detector to perform a gray balancing of the image.

12. A method of improving clarity of an image, comprising:
determining a representative color of the image and moving a color of an edge to the determined representative color;
filtering a high frequency component of the image; and
improving the clarity of the image and the high frequency component of the image in which the color of the edge is moved,
wherein the moving the color of the edge comprises extracting the representative color by each block unit of the image, improving a contrast of the extracted representative color, and moving the color of the edge to the representative color having the improved contrast.

13. The method according to claim 12, wherein the extracting the representative color comprises extracting pairs of R, G and B values of a pixel with minimum and maximum luminance values as an initial representative color after obtaining luminance values with respect to R, G and B components of the image in a certain block of the image.

14. The method according to claim 13, wherein the improving the contrast comprises updating a pair of initial representative colors using an inner product of a distance between one of the pair of initial representative colors and the other of the pair of initial representative colors, and a distance between one of the pair of initial representative colors and a certain pixel in the block.

15. The method according to claim 14, wherein the improving the contrast comprises improving the contrast in a preset critical value with respect to the pair of the initial representative colors.

16. The method according to claim 15, wherein the moving the color comprises measuring a proximity of a certain pixel of an edge and a resultant representative color having an updated contrast, and an edge intensity, and using the measurement of the proximity and the edge intensity to move the color of the certain pixel of the edge.

17. The method according to claim 16, wherein the edge intensity is obtained by adding a distance between a pair of resultant representative colors and a distance between resultant representative colors in each block of the image.

18. The method according to claim 16, wherein the proximity is obtained through a ratio of the distance between the resultant representative color and the certain pixel of the edge.

19. The method according to claim 16, wherein the moving the color comprises obtaining an extent of transfer from the edge intensity and the proximity to move the color with respect to the certain pixel of the edge according to the extent of transfer.

20. The method according to claim 12, wherein the improving the clarity comprises adding the extracted high frequency component to the image in which the color of the edge is moved.

21. The method according to claim 20, wherein the improving the clarity comprises determining that a certain block has an intensive edge, reducing a gain of a high frequency component when a distance between two representative colors increases in the certain block, and increasing a gain of the high frequency component when the distance between the representative colors decreases.

22. The method according to claim 20, wherein the improving the clarity further comprises performing a gray balancing of the image.

23. A nontransitory storage medium storing software structure elements that control at least one processor to implement the method of claim 12.

24. A method of improving clarity of an image having an object and a background, comprising:
- extracting a pair of initial representative colors from a block of the image, a color of the object being one of the initial representative colors and a color of the background being the other of the initial representative colors;
- improving a contrast of each representative color in the extracted pair of initial representative colors;
- moving a color of an edge of the object as one of the initial representative colors; and
- improving clarity of the image having the color of the edge moved.

25. A nontransitory storage medium storing software structure elements that control at least one processor to implement the method of claim 24.

* * * * *